United States Patent
Basso et al.

(10) Patent No.: US 7,065,086 B2
(45) Date of Patent: Jun. 20, 2006

(54) METHOD AND SYSTEM FOR EFFICIENT LAYER 3-LAYER 7 ROUTING OF INTERNET PROTOCOL ("IP") FRAGMENTS

(75) Inventors: Claude Basso, Raleigh, NC (US); Jean Louis Calvignac, Cary, NC (US); Philippe Damon, Carrboro, NC (US); Gordon Taylor Davis, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 09/931,206

(22) Filed: Aug. 16, 2001

(65) Prior Publication Data

US 2003/0039249 A1    Feb. 27, 2003

(51) Int. Cl.
*H04L 12/28* (2006.01)

(52) U.S. Cl. .................. 370/394; 370/473; 709/230; 709/238

(58) Field of Classification Search ............... 370/474, 370/394
See application file for complete search history.

(56) References Cited

U.S. PATENT DOCUMENTS

| | | | |
|---|---|---|---|
| 5,598,410 A | | 1/1997 | Stone |
| 5,835,710 A | | 11/1998 | Nagami et al. |
| 5,842,040 A | * | 11/1998 | Hughes et al. ............... 710/11 |
| 5,991,302 A | | 11/1999 | Berl et al. |
| 6,084,855 A | | 7/2000 | Soirinsuo et al. |
| 6,212,190 B1 | * | 4/2001 | Mulligan ................... 370/400 |
| 6,247,060 B1 | * | 6/2001 | Boucher et al. ........... 709/238 |
| 6,341,129 B1 | * | 1/2002 | Schroeder et al. ......... 370/354 |
| 6,594,260 B1 | * | 7/2003 | Aviani et al. .............. 370/389 |
| 6,714,985 B1 | * | 3/2004 | Malagrino et al. ......... 709/236 |
| 6,742,045 B1 | * | 5/2004 | Albert et al. ............... 709/238 |
| 6,785,239 B1 | * | 8/2004 | Tasker ....................... 370/238 |
| 6,832,261 B1 | * | 12/2004 | Westbrook et al. ........ 709/236 |
| 6,880,017 B1 | * | 4/2005 | Marce et al. .............. 709/232 |
| 2001/0036185 A1 | * | 11/2001 | Dempo ...................... 370/392 |
| 2001/0048681 A1 | * | 12/2001 | Bilic et al. ................. 370/389 |

* cited by examiner

*Primary Examiner*—Frank Duong
(74) *Attorney, Agent, or Firm*—Joscelyn G. Cockburn; Steven Fischman; Scully, Scott, Murphy & Presser

(57) ABSTRACT

According to the present invention there is provided to a method and system for efficiently routing IP fragments (i.e., datagrams) at layer 3 through layer 7 of the OSI model without reassembling the fragments. Time-consuming reassembly of fragments of a datagram at higher layers that would be required via conventional methods is avoided, thereby improving processing speed of fragments and utilizing fewer resources for processing fragments of a datagram than would be required during reassembly of the fragments via conventional methods. The method and system route a datagram that has been fragmented into a plurality of fragments utilizing content-based routing information included in one or more fragments of the plurality of fragments, comprising: generating a context for the datagram associated with routing the plurality of fragments of the datagram and setting the context for the datagram to passive until content-based routing information included in the one or more fragments is received; caching received fragments while the context is set to passive; determining a destination for routing the plurality of fragments when content-based routing information included in the one or more fragments is received and setting the context for the datagram to active; and routing any cached fragments and subsequently received fragments of the datagram to the determined destination while the context is active without reassembling the plurality of fragments into the datagram. Additionally, a router and server load balancer incorporating the present invention are provided.

39 Claims, 9 Drawing Sheets

METHOD AND SYSTEM FOR EFFICIENT LAYER 3-LAYER 7 ROUTING OF INTERNET PROTOCOL ("IP") FRAGMENTS

BACKGROUND OF THE INVENTION

1. Technical Field of the Invention

The present invention generally relates to datagram routing. More particularly, the present invention relates to a method and system for efficiently routing Internet Protocol ("IP") fragments at layer 3 through layer 7 of the Open System Interconnection (i.e., "OSI") hierarchical model without reassembling the fragments.

2. Description of the Prior Art

Computers and communication networks, such as the Internet, provide important advantages to enterprises and individuals in today's society. Moreover, with the advent and ensuing popularity of the World Wide Web ("Web"), there has resulted a tremendous increase in volume and usage of networked computer systems. Networked computer systems, i.e., computer systems connected via communication networks including the Internet, communicate by using protocols, such as for example, TCP/IP ("Transfer Control Protocol/Internet Protocol"), which comprises a collection of protocols used in large-scale mixed-platform packet-switched networks (i.e., Internet). As will be described hereinafter with reference to FIGS. 1 through 3, this collection of protocols transfers and verifies receipt of datagrams (i.e., packets), which include header information for routing the datagrams between a source and a destination, in addition to including a payload, i.e., data, to be transmitted to the destination.

As will be appreciated in one skilled in the art, new network applications, such as server load-balancing applications, fire walls and more generally any content-based or class-of-service based routing applications typically execute datagram routing services according to a layered networking framework known as the OSI and more particularly perform routing from layer 3 (i.e., network layer 106) through layer 7 (i.e., application layer 114) of the OSI model, as particularly depicted in FIG. 1. The higher the layer in the OSI model at which content-based routing is performed, the more difficult it is to perform routing because the content-based routing information is located deeper in the datagram (i.e., deep-packet processing).

FIG. 1 is a prior art depiction of the Open System Interconnection (i.e., "OSI") model 100 that defines a networking framework for implementing protocols in a seven-layer architecture. Each of the seven layers represents a function that is to be performed to effect communications between different computers systems over the communication network, such as the Internet. Furthermore, each layer performs services at the request of the adjacent higher layer and, in turn, requests more basic services from the adjacent lower layer. It should however be noted that most of the functionality in the OSI model exists in all communication systems, although two or three of the OSI layers may be incorporated into one layer depending upon implementation of the communication systems.

Now particularly referring to FIG. 1, the lowest of the seven hierarchical layers in the OSI model is the physical layer 102 (i.e., layer 1). The physical layer 102 performs services requested by a data link layer 104 (i.e., layer 2), the next layer on the hierarchical OSI model. The major functions and services performed by the physical layer 102 are: 1) establishment and termination of a connection to a communication medium (e.g., Internet); participation in effectively sharing communication resources among multiple users (e.g., contention resolution and flow control); and 3) conversion between representation of data in user equipment and corresponding data transmitted over communications media. The most notable physical layer interfaces include EIA RS-232 and RS-449. The data link layer 104 (i.e., layer 2) responds to service requests from the network layer 106 (i.e., layer 3) and issues service requests to the physical layer 102. Furthermore, the data link layer 104 provides functional and procedural mechanisms for transferring data between network entities and for detecting and possibly correcting errors that may occur in the physical layer 102. The most notable examples of data link protocols are: high-level data link control ("HDLC") and advanced data communications control procedure ("ADCCP") for point-to-point or packet-switched networks and logical link control ("LLC") for local area networks.

Further with reference to FIG. 1, the next layer of the hierarchical OSI model is the network layer 106, (i.e., layer 3). The network layer 106 responds to service requests from the transport layer 108 and issues service requests to the data link layer 104. Furthermore, the network layer 106 provides functional and procedural mechanisms for transferring data from a source to a destination via one or more networks while maintaining the quality of service ("QoS") requested by the transport layer 108. Additionally, the network layer 106 performs network routing, flow control, segmentation and de-segmentation, and error control functions. The next layer of the OSI model is the transport layer 108 (i.e., layer 4). The transport layer 108 responds to service requests from the session layer 110 and issues service requests to the network layer 106. The transport layer 108 provides transparent transfer of the data between the source and the destination (i.e., end-user computer systems), thereby relieving upper layers of the OSI model from any concern regarding reliable and cost-effective data transfer. The transport layer 108 functions include monitoring of data flow for ensuring proper delivery of data between the source and the destination. Furthermore the transport layer 108 provides for data correction, data fragmentation and reassembly. The most notable protocol of the transport layer is TCP, which is a main protocol in TCP/IP networks. Whereas the IP protocol deals only with packets, TCP enables two hosts to establish a connection and to exchange streams of data. TCP guarantees delivery of data and also guarantees that packets will be delivered in the same order in which they were sent.

Still further with reference to FIG. 1, the next layer of the hierarchical OSI model is the session layer 110, (i.e., layer 5). The session layer 110 responds to service requests from the presentation layer 112 (i.e., layer 6) and issues service requests to the transport layer 108. The session layer 110 provides a mechanism for managing the dialogue between end-user application processes. It provides for either duplex or half-duplex operation and establishes check-pointing, adjournment, termination, and restart procedures. The next layer of the OSI model is the presentation layer 112, which responds to service requests from the application layer 114 and issues service requests to the session layer 110. The presentation layer 112 relieves the application layer of concern regarding syntactical differences in data representation or display within the end-user systems. The most notable example of a presentation layer service would be the conversion of an EBCDIC-coded text file to an ASCII-coded file. The topmost layer of the OSI model is the application layer 114 (i.e., layer 7), which interfaces directly to and performs common application services for the end-user application processes. Furthermore, the application layer 114 issues requests to the presentation layer 112. The common application services provide semantic conversion between associated application processes. The most notable examples of common application services include: virtual file, virtual terminal, and job transfer and manipulation protocols.

FIG. 2 is a prior art depiction of an Internet protocol ("IP") datagram 200 that illustrates an IP header 201 and a TCP header 203. IP utilizes datagrams (i.e., packets) to communicate over packet-switched networks (e.g., the Internet). The datagram 200 represents a piece of a message transmitted over the packet-switched networks. The datagram 200 comprises an IP header 201, which includes fields 202 . . . 224 and data 207. Data 207 comprises a TCP header 203, which includes fields 226–248, as well data 205. Among other things, the IP header 201 includes a source address 222 and destination address 224 for routing the datagram. Packet switching refers to the foregoing protocols that, among other things, divide a message to be sent into packets for transmission. Each packet is individually transmitted and may follow different routes to the destination address. Once all the packets forming the message arrive at the destination, they are assembled into the original message. It should be noted that IP datagrams are sent without establishment of communication paths or clearing procedures. Thus, there may be no protection against loss, duplication, misdelivery, and the like. Further with reference to FIG. 2, the IP header 201 includes five 32-bit words, each of which is subdivided into fields, description of which will be made in more detail hereafter. The version field 202, which is four bits, indicates a format of the IP header 201. The IHL field 204 (i.e., internal header length), which is four bits, represents the length of the IP header 201 in 32-bit words. It should be noted that the minimum value for a correct IP header 201 is five (i.e., five 32-bit words). The type of service field 206, which is eight bits, represents an indication of abstract parameters for a quality of service (i.e., "QoS") to guide selection of actual service parameters when transmitting the datagram 200 through a particular network over the Internet. The total length field 208, which is 16 bits, represents a total length of the datagram 200 in octets (i.e., an octet is 8 bits in length), including both the IP header 201 and data length 207. It should be noted that data 207 of the IP datagram 200 comprises the TCP header 203 and data 205. The identifier field 210, which is 16 bits, represents an identifying value assigned by a sender to aid in assembly of fragments of a datagram, which will be described in greater detail hereinafter. The flags field 212, which is three bits, represents various control flags directed to fragmentation that is described likewise described in greater detail hereinafter. The fragment offset field 214, which is 13 bits, indicates a position of the datagram 200 to which a particular fragment belongs. It should be noted that the fragment offset in field 214 is measured in octets, wherein the fragment offset for a first fragment is zero.

Yet further with regard to FIG. 2, the time to live field 216 (i.e., "TTL"), which is 8 bits, indicates a maximum time that the datagram 200 is allowed to remain on the Internet. It should be noted that is the value of field 216 is measured in seconds and if it reaches zero, the datagram 200 is destroyed. The protocol field 218, which is eight bits, indicates a next level protocol used in the data portion of the datagram, such as TCP protocol described herein below. The header checksum field 220, which is 16 bits, represents a checksum only for the IP header 201 of the datagram 200. The checksum 220 is a simple error-detection scheme in which the datagram 200 is accompanied by a numerical value based on the number of set bits in the IP header 201. It should be noted that since values in various header fields change, the value of field 220 is recomputed and verified at each point where the IP header 201 of datagram 200 is processed. The source address field 222 and destination address field 224, which are 32 bits in length, respectively provide the source and destination addresses for the datagram 200.

Still further with reference to FIG. 2, the TCP header 201 includes six 32-bit words, each of which is subdivided into fields, description of which will be made in more detail hereafter. The source port field 226, which is 16 bits, indicates a source port number. The destination port 228, which is likewise 16 bits, indicates a destination port. In TCP/IP packet-switched networks, the source and destination ports represent endpoint of a logical connection. A port number of 80 is generally used for HTTP (i.e., HyperText Transfer Protocol) traffic. The sequence number field 230 indicates a first data octet in a fragment, except that if SYN is present, the sequence number 320 is ISN+1 (i.e., initial sequence number). The acknowledgement number filed 232, which is 16 bits, is used for error correction and generally contains a value of a next sequence number to be received. The data offset filed 234, which is 4 bits, represents a number of 32-bit words in the TCP header 203. Thus, this number generally indicates where data 205 of datagram 200 begins. The reserved field 236, which is 6 bits in length, represents bits reserved for future use and is presently set to zero. The flags field 238, comprises six control bits, including: 1) urgent pointer field significant (i.e., URG); 2) acknowledgement field significant (i.e., ACK); 3) push function (i.e., PSH); 4) reset the connection (i.e., RST); 5) synchronize sequence numbers (i.e., SYN) and 6) no more data from the sender (i.e., FIN). Window field, which is 16 bits, indicates a number of data octets that the sender of this fragment is willing to accept, beginning with the first octet indicated in the acknowledgement number field 230. The TCP checksum field 242, which is 16 bits, is used for error detection. The urgent pointer field 244 which is 16 bits, represents a current value of the urgent pointer as a positive offset from the sequence number field 230 in this fragment. That is, the urgent pointer points to a sequence number of an octet following urgent data and urgent pointer field 244 is interpreted only if the URG control bit is set in field 238. The options field 246 is a variable length field that represents options that are available. The options field may or may not appear in the datagram. The padding field 248 represents padding that ensures that the TCP header 203 ends on a 32-bit boundary.

FIG. 3 is a prior art high-level illustration 300 of datagram 200 fragmentation. One of the mechanisms of the Internet Protocol ("IP") routing is fragmentation and reassembly of datagrams. While being transmitted over the Internet via myriad intermediary packet-switched networks, the contents of datagram 200 do not change on the way to its destination unless fragmentation occurs. Every physical network of the Internet has its own limitation on the size of data that it may carry, which is indicated by an associated MTU (i.e., maximum transmission unit). Under some circumstances, particularly when a large datagram must travel through a network with a smaller MTU, the datagram must be divided into a plurality of smaller fragments at appropriate places 302 (i.e., which are also datagrams) within the smaller MTU, such as fragment I 301 and fragment II 303, so that the fragments may travel through the network onto their journey to the destination. This process of division is called fragmentation. Every fragment 301 and 303 includes an IP header HD-I 304 and HD-II 310, and each of which respectively carries data 308 and 312 that is part of data 207 of the original datagram 200. It should be noted that during fragmentation, only a sequentially first fragment 301 includes a TCP header field 306 that receives the TCP header 203 from datagram 200. Conventionally, the IP of the TCP/IP protocol suite, which is generally located at the network layer 106 of the OSI model of FIG. 1 (i.e., layer 3), must accumulate received fragments until enough have arrived to completely reassemble the original datagram 200 via a process called reassembly. The reassembly processes utilizes the identification field 210, flags field 212, the source address 222 and the destination address 224, and the protocol field 218 to identify received fragments for their reassembly into the original datagram 200.

More particularly with regard to FIGS. 3, it should be noted that datagram 200 may be fragmented into a plurality of fragments, which for simplicity are illustrated as two fragments 301 and 303. Content-based routing that today is necessitated by server load-balancing applications, firewalls, and the like, is cumbersome, inefficient and resource intensive with the conventional IP fragmentation and reassembly processes. First, the IP is unable to correctly route fragments of a datagram utilizing content-based routing because all the fragments do not contain the necessary content-based routing information, such as for example the TCP information that is included only in fragment 301 (i.e., sequentially first fragment). Second, fragments may be disordered when they are received, so that the sequentially first fragment 301 (or fragment 303 of FIG. 4) that contains content-based routing information may be received after the other fragment that do not content-based routing information. Lastly, the last fragment 303 may disordered when received, so that it may not be received last, thereby affecting reassembly at the IP layer. That is, the last fragment is utilized to ascertain whether all fragments of datagram 200 have been received based on their respective lengths of data 308, 312.

FIG. 4 is a prior art depiction 400 of a datagram 200 fragmented into three fragments. The datagram 200 comprises an IP header 201 and data 207, which includes a TCP header 203, and data 205. Data 205 includes cookie 404 for content-based routing. In a conventional fragmentation process, the datagram 200 is fragmented into: fragment I 301, which comprises IP header HD-I 304, TCP header 306, and data 308; fragment II 303, which comprises IP header HD-II 310, data 312 that includes cookie 406 (i.e., cookie 404 of datagram 200); and fragment III 305, which comprises IP header HD-III 408 and data 410. It is to be noted that the content-based information necessary for content-based routing, in this case cookie 404, is located in a sequentially second fragment 303.

Today, a solution to the above-identified problems associated with content-based routing in a fragmentation situation is reassembly as described hereinabove. That is, the fragments are first reassembled into the original datagram at a considered layer of the OSI model (i.e., layer 3–layer 7) of FIG. 1, so as to enable content-based routing to be performed based on the now available content-based routing information. The layer at which reassembly occurs depends on system implementation. For example, a simple IP router may reassemble at layer 3 of the OSI model (IP), while a simple server load balancer may reassemble at layer 4 of the OSI model (TCP). Furthermore, a firewall or any other application implementing a TCP End Point or TCP termination necessarily reassembles at layer 4 of the OSI model (TCP). However, conventional reassembly at the foregoing layers has many drawbacks. During conventional reassembly, all fragments necessarily must be stored before the original datagram is reassembled, thereby requiring large amount of memory and slowing content-based routing time, which proportionally increases with reassembly time of the original datagram. Additionally, hardware required for reassembly may not have the capacity to perform such storage.

It is therefore highly desirable to enable content-based routing of fragments at layer 3 through layer 7 of the OSI model, while avoiding time-consuming and resource-consuming reassembly of the fragments at these layers.

SUMMARY OF THE INVENTION

It is therefore an object of the present invention to provide to a method and system for efficiently routing IP fragments (i.e., datagrams) at layer 3 through layer 7 of the OSI model.

It is another an object of the present invention to avoid time-consuming reassembly of fragments of a datagram at higher layers (i.e., layers 3–7) that would be required via conventional methods, thereby improving processing speed of fragments.

It is a further object of the present invention to utilize fewer resources for processing fragments of a datagram than would be required during reassembly of the fragments via conventional methods, by reducing the necessity of storing fragments.

Thus according to an embodiment of the present invention, there is provided A method for routing a datagram that has been fragmented into a plurality of fragments utilizing content-based routing information included in one or more fragments of the plurality of fragments, the method comprising: generating a context for the datagram associated with routing the plurality of fragments of the datagram and setting the context for the datagram to passive until content-based routing information included in the one or more fragments is received; caching received fragments while the context is set to passive; determining a destination for routing the plurality of fragments when content-based routing information included in the one or more fragments is received and setting the context for the datagram to active; and routing any cached fragments and subsequently received fragments of the datagram to the determined destination while the content is active without reassembling the plurality of fragments into the datagram.

According to another embodiment of the present invention there is provided a system for routing a datagram that has been fragmented into a plurality of fragments utilizing content-based routing information included in one or more fragments of the plurality of fragments, the system comprising: a receiving mechanism for receiving the plurality of fragments of the datagram; a control mechanism for generating a context for the datagram associated with routing the plurality of fragments of the datagram and setting the context for the datagram to passive until content-based routing information included in the one or more fragments is received; a cache for caching received fragments while the context is set to passive; a routing mechanism for determining a destination for routing the plurality of fragments when content-based routing information included in the one or more fragments is received and setting the context for the datagram to active; and a forwarding mechanism for transmitting any cached fragments and subsequently received fragments of the datagram to the determined driver while the context is active without reassembly of the plurality of fragments into the datagram.

According to yet another embodiment, there is provided a program storage device readable by a machine, tangibly embodying a program of instructions executable by the machine to perform the method steps for routing a datagram that has been fragmented into a plurality of fragments utilizing content-based routing information included in one or more fragments of the plurality of fragments, the method comprising: generating a context for the datagram associated with routing the plurality of fragments of the datagram and setting the context for the datagram to passive until content-based routing information included in the one or more fragments is received; caching received fragments while the context is set to passive; determining a destination for routing the plurality of fragments when content-based routing information included in the one or more fragments is received and setting the context for the datagram to active; and routing any cached fragments and subsequently received fragments of the datagram to the determined destination while the content is active without reassembling the plurality of fragments into the datagram.

According to the present invention, there is provided a router routing a datagram that has been fragmented into a plurality of fragments utilizing content-based routing information included in one or more fragments of the plurality of fragments, the router comprising: a receiving mechanism receiving the plurality of fragments of the datagram; a routing mechanism generating a context for the datagram associated with routing the plurality of fragments of the datagram and setting the context for the datagram to passive until content-based routing information included in the one or more fragments is received, the routing mechanism caching fragments until the context is set to active for routing the cached fragments, the routing mechanism determining a destination port for routing the plurality of fragments from received content-based routing information included in the one or more fragments and setting the context for the datagram to active; and a forwarding mechanism transmitting any cached fragments and subsequently received fragments of the datagram to the determined destination port without reassembly of the plurality of fragments into the datagram.

According to the present invention, there is provided a router for routing a datagram that has been fragmented into a plurality of fragments utilizing content-based routing information included in one or more fragments of the plurality of fragments, the router comprising: a receiving mechanism for receiving the plurality of fragments of the datagram; a control mechanism for generating a context for the datagram associated with routing the plurality of fragments of the datagram and setting the context for the datagram to passive until content-based routing information included in the one or more fragments is received; a cache for caching received fragments while the context is set to passive; a routing mechanism for determining a destination port for routing the plurality of fragments when content-based routing information included in the one or more fragments is received and setting the context for the datagram to active; and a forwarding mechanism for transmitting any cached fragments and subsequently received fragments of the datagram to the determined destination port while the context is active without reassembly of the plurality of fragments into the datagram.

According to the present invention, there is also provided a server load balancer for routing a datagram that has been fragmented into a plurality of fragments utilizing content-based routing information included in one or more fragments of the plurality of fragments, the server load balancer comprising: a receiving mechanism for receiving the plurality of fragments of the datagram; a control mechanism for generating a context for the datagram associated with routing the plurality of fragments of the datagram and setting the context for the datagram to passive until content-based routing information included in the one or more fragments is received; a cache for caching received fragments while the context is set to passive; a routing mechansim for determining a destination device driver for routing the plurality of fragments when content-based routing information included in the one or more fragments is received and setting the context for the datagram to active; and a forwarding mechanism for transmitting any cached fragments and subsequently received fragments of the datagram to the determined destination device driver while the context is active without reassembly of the plurality of fragments into the datagram.

Advantageously, the present invention may be implemented via hardware or software means.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENT OF THE INVENTION

The present invention is directed to a system and method for efficiently routing fragments of a datagram at layer 3 through layer 7 of the OSI model (i.e., content-based routing) without reassembling the fragments at these layers.

A main element of the inventive method and system for content-based routing is the maintenance of a context for a fragmented IP datagram. This is preferably accomplished by creating a Packet Cache Control Block (i.e., "PCCB") for every fragmented IP datagram to be routed at layer 3 through layer 7 of the OSI model utilizing content-based information. The PCCB is a software or hardware construct, or a combination thereof, maintained at network nodes that process IP datagrams for performing content-based routing. The network nodes include, but are not limited to, routers at the core or at the edge of a network, server load balancers, and firewalls. FIGS. 5–8 provide a description regarding content-based routing of fragments of a fragmented IP datagram by utilizing the PCCB and content-based routing information of a sequentially first fragment according to the present invention. It should be noted that fragments of the fragmented IP datagram are also datagrams, although generally only a sequentially first fragment (i.e., also datagram) includes content-based routing information. As will be described herein below, the method illustrated in FIGS. 5–8 of the present invention may be extended to perform content-based routing utilizing content-based information spanning any one or more fragments of the fragmented IP datagram.

Figure 1:
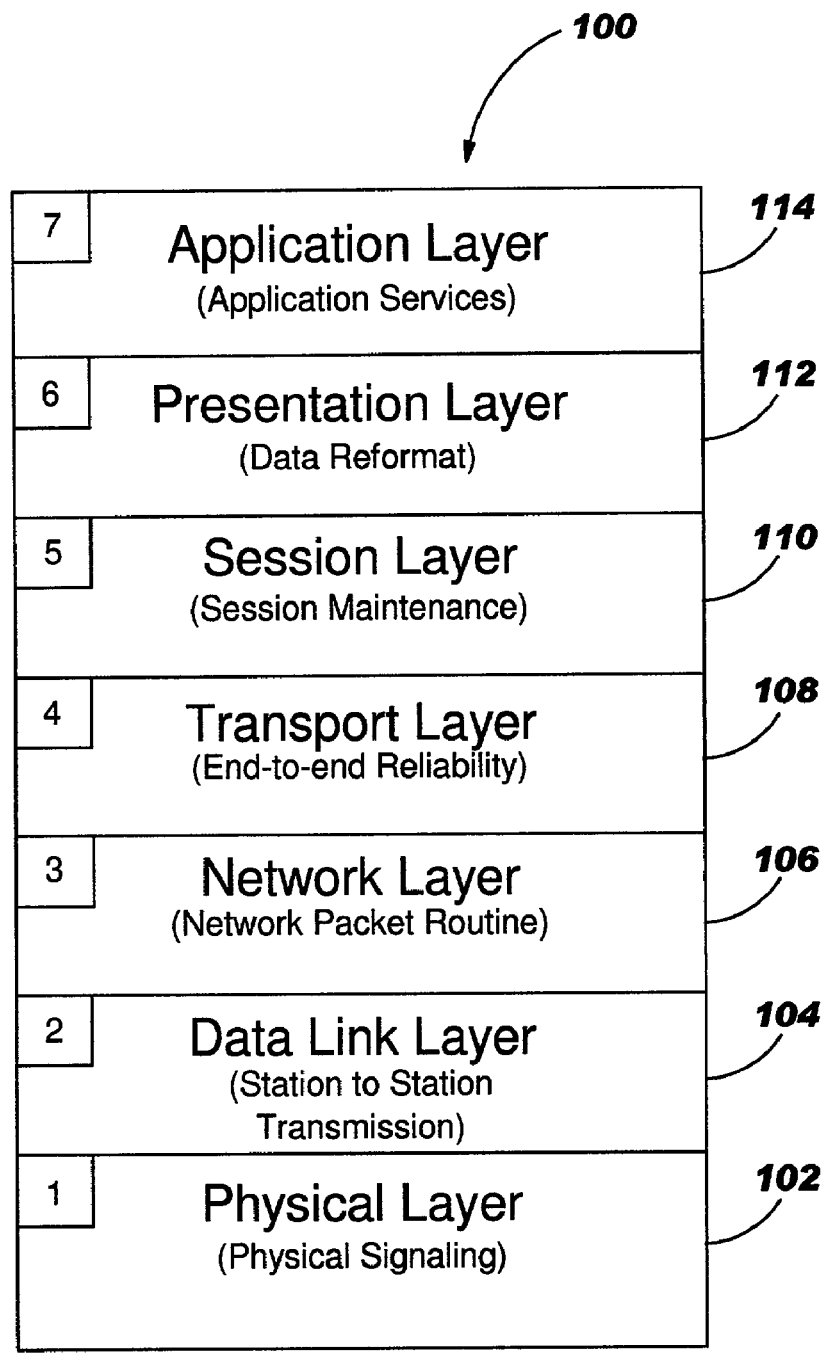
FIG. 1 depicts a prior art Open System Interconnection ("OSI") model that defines a networking framework for implementing protocols in a seven-layer architecture.
Figure 2:
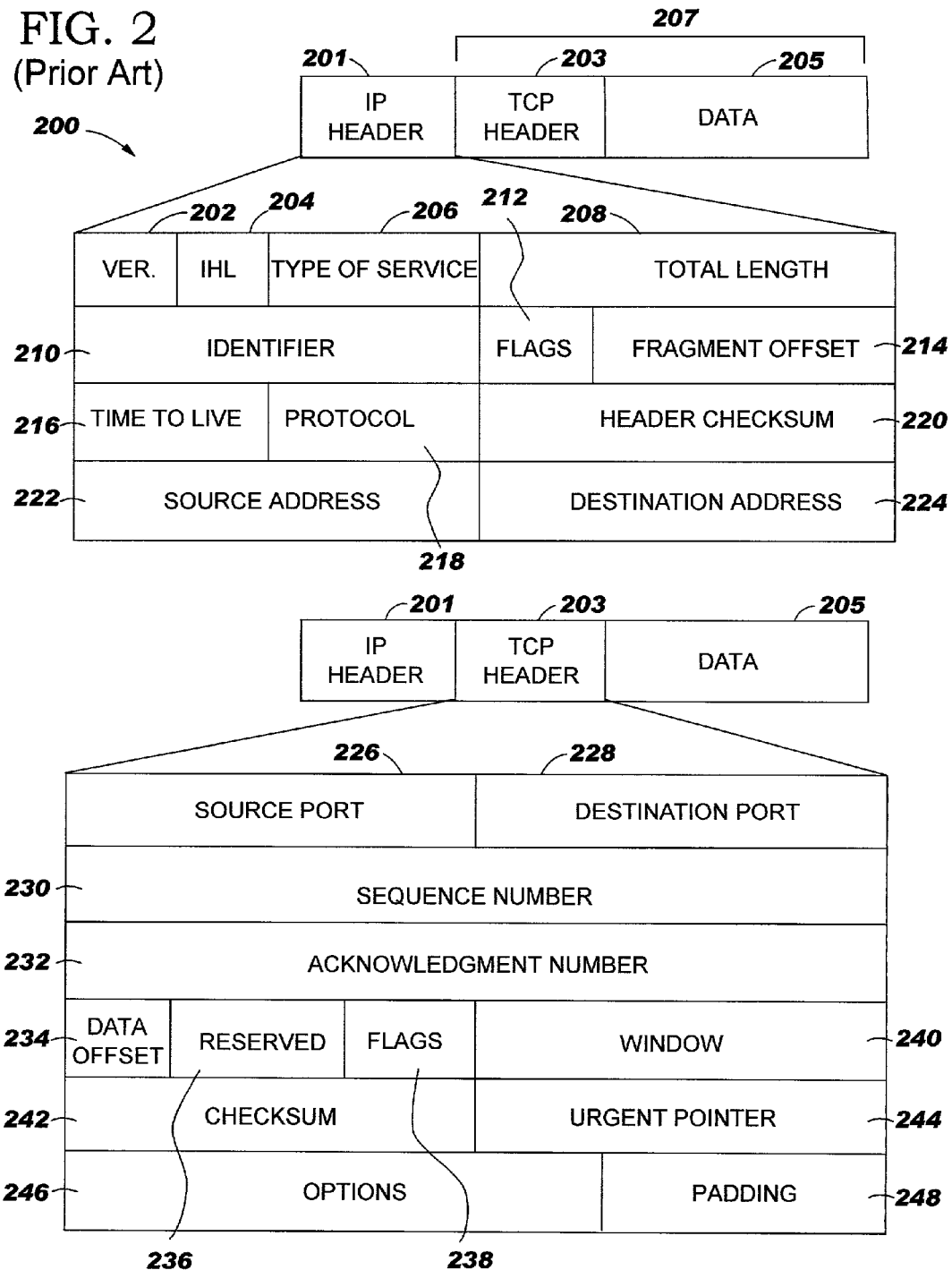
FIG. 2 depicts a prior art Internet Protocol ("IP") datagram, which comprises an IP header and a TCP header.
Figure 3:
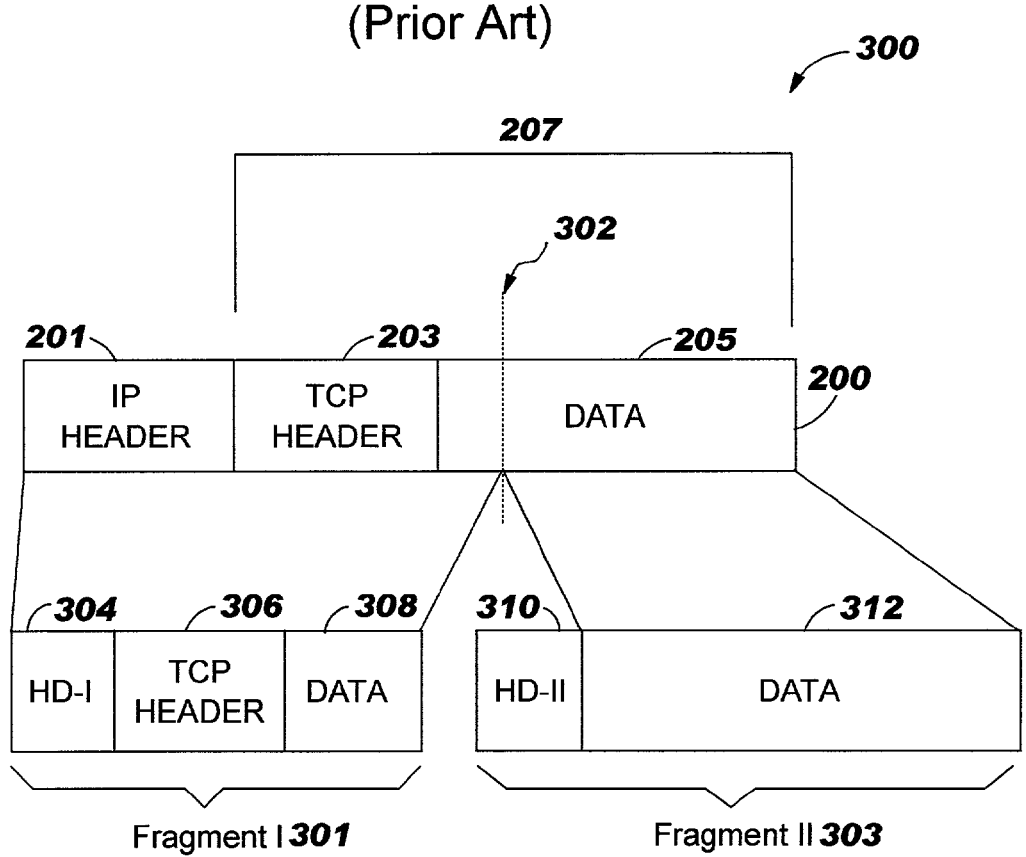
FIG. 3 depicts a variant of a prior art conventional fragmentation of the IP datagram of FIG. 2.
Figure 5:
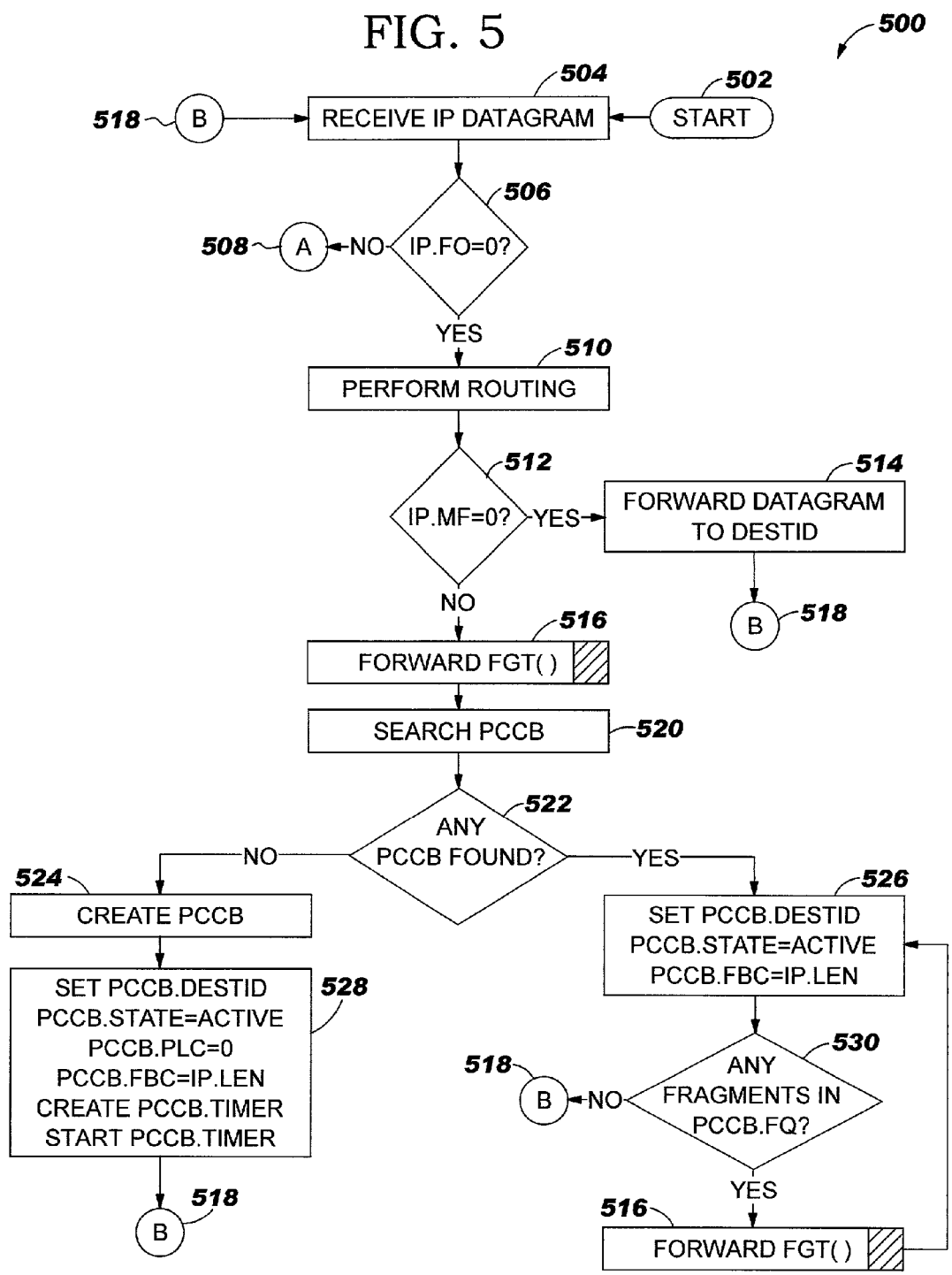
FIG. 5 is an exemplary flowchart representation of processing performed upon receipt of a sequentially first IP fragment of a fragmented datagram according to the present invention.

FIG. 5 is an exemplary flowchart representation 500 of processing performed upon receipt of a sequentially first IP fragment of a fragmented IP datagram according to the present invention. The processing begins at step 502. At step 504, an IP datagram is received. At step 506, it is determined whether a value for fragment offset (i.e., "FO") of the received IP datagram, which is illustrated as fragment offset field 214 of FIG. 2, represents a beginning of the received IP datagram. If the fragment offset equals zero (i.e., IP.FO=0), the received IP datagram represents a beginning of the datagram, but not necessarily that there has been fragmentation. Otherwise, a non-zero fragment offset represents that there has been fragmentation for the received IP datagram. In either case content-based routing may be performed respectively at step 510 of FIG. 5 and at step 602 of FIG. 6 for the foregoing fragment. As aforementioned, the beginning of the datagram generally includes information that is necessary for content-based routing. Generally, content-based routing information may include any field in the IP header 201, TCP header 203 of FIG. 2. Most commonly, however, content-based routing information of particular interest includes protocol 218, source address 222, destination address 224, source port 226 and destination port 228 of FIG. 2, associated quality of service parameters (i.e., "QoS" parameters) found in the IP header 201 type of service field 206 of FIG. 2. Other content-based routing information of interest in the IP datagram may include Universal Resource Locator (i.e., URL), cookies and the like, which generally are located within data 205. The content-based routing information that is obtained from the IP datagram is preferably temporarily read into volatile memory (i.e., random access memory) at the receiving network node, or alternatively, stored in non-volatile memory (i.e., hard disk, and the like). Returning to FIG. 5, at step 512, it is determined whether a value of a more fragment (i.e., "MF") of the received IP datagram, which is a flag included in the flags field 212 of FIG. 2, represents that there has been fragmentation of the received IP datagram. If the more fragment flag equals zero (i.e., IP.MF=0), there has been no fragmentation and the IP datagram is forwarded to its destination using content-based routing at step 514, i.e., based on contents of the TCP header 203 of IP datagram 200.

However, if at step 512, it is determined that the more fragment flag is not equal to zero (i.e., IP.MF!=0), this indicates that there has been fragmentation and the received IP datagram represents a sequentially first fragment. Thus, at step 516, the first fragment, which contains relevant content-based information, is forwarded to its destination via ForwardFGT( ) forwarding procedure described with respect to FIG. 7. It should be noted that all fragments of a fragmented IP datagram have the same identification 210 (i.e., IP.FRID), protocol type 218 (i.e., IP.PT), source address 222 (i.e., IP.SA) and destination address 224 (i.e., IP.DA). Utilizing values of the foregoing fields of the received IP datagram fragment, a search is performed at step 520 to determine whether a PCCB has been created for the fragmented IP datagram. Conventional or proprietary searching techniques may be utilized to perform this search. It should be noted that a PCCB is preferably created for every fragmented IP datagram.

If at step 522, a PCCB with matching values for the foregoing fields is not found, a new PCCB for the fragmented IP datagram is created at step 524. At step 528, the content-based routing information from the sequentially first fragment (e.g., source address, destination address, source port and destination port, and the like) is utilized as input to a routing function (i.e., described hereinafter with regard to FIG. 10), which determines and sets a destination identifier in the PCCB (i.e., described hereinafter with regard to FIG. 9) for routing of subsequent fragments of the fragmented IP datagram. The destination identifier uniquely identifies a destination to which all fragments of the fragmented IP datagram must be forwarded by a forwarding mechanism (i.e., described hereinafter with regard to FIG. 10). As will be described with reference to FIG. 11 and 12, the destination identifier is dependent on system implementation. The state of the PCCB is set to active (i.e., PCCB.state=Active), which indicates that the packet cache control block is active for content-based routing of subsequent fragments received for the fragmented IP datagram, since content-based routing information has already been obtained from the sequentially first fragment. A place of the PCCB is set to zero (i.e., PCCB.PLC=0) to indicate that a sequentially last fragment has not yet been received. Furthermore, a length of the received IP fragment is ascertained and is copied into the fragment byte counter portion of the FCCB (i.e., FCCB.FBC=IP.len). Yet further, a timer is created and initiated for the PCCB (i.e., PCCB.timer) for identifying how long the fragmented IP datagram is allowed to be on the Internet. Once the foregoing PCCB parameters are set, processing continues at step 518 by looping back step 504 to receive the next IP datagram at step 504.

However, if at step 522 a PCCB is found for the received fragment (i.e., sequentially first IP fragment) of the fragmented IP datagram utilizing the foregoing fields, then some fields of the PCCB have to be updated at step 526 to take account of the content-based routing information included in the received sequentially first IP fragment. More particularly, the content-based routing information from the sequentially first fragment is utilized as input to the routing function (i.e., described hereinafter with reference to FIG. 10), the output of which is a destination identification that is set in the PCCB for content-based routing of subsequent fragments of the fragmented IP datagram. Further, the state of the PCCB is set to active (i.e., PCCB.state=Active). Yet further, the fragment byte counter of the PCCB is updated by aggregating length of the received IP fragment with lengths of fragments received prior to the currently received IP fragment (i.e., PCCB.FBC+=IP.len). That is, the fragment byte counter is incremented by a length of each received fragment (i.e., represented by IP.len). Steps 530 and 516 represent a looping structure where all fragments received prior to receiving a sequentially first fragment of the fragmented IP datagram are forwarded to the destination ascertained as a result of content-based routing information of the sequentially first fragment via ForwardFGT( ) procedure that will be described in greater detail with regard FIG. 7 hereinafter. It should be noted that all fragments received prior to receiving the sequentially first fragment are stored in a fragment queue of the PCCB (i.e., PCCB.FQ), which is described in greater detail with regard to FIGS. 6 and 9. Once all received fragments are forwarded to their destination (i.e., content-based routing is performed), at step 518 processing loops back to step 504 to receive another IP datagram.

Table 1 particularly illustrates a pseudo code representation of the inventive method depicted in the flowchart of FIG. 5, which illustrates processing performed upon receipt of a sequentially first IP fragment of a fragmented IP datagram according to the present invention.

TABLE 1

```
//assume that a fragment of a fragmented IP datagram has been received
If (IP.FO==0) { // beginning of received datagram
    Perform layer 3-layer 7 content-based routing // obtain DestID
    If (IP.MF==0) { // there is no fragmentation
        Forward the received datagram to its destination
    }
    Else {
        ForwardFGT( ) // forward fragment to destination procedure
        Search for PCCB (IP.SA, IP.DA, IP.PT, IP.FRID)
        If (PCCB not found) {
            Create PCCB // create a packet cache control block
            PCCB.DestID=DestID // set destination identification
            PCCB.state=Active // PCCB is active for routing
            PCCB.PLC=0// last fragment not yet received
            PCCB.FBC=IP.len // set fragment byte counter
            Create and start PCCB.timer //timer needed
        }
        Else { //PCCB already exists
            PCCB.DestID=DestID // set destination identification
            PCCB.state=Active
            PCCB.FBC+=IP.len // get and aggregate bytes in all fragments
            For all fragments in PCCB.FQ {
                ForwardFGT() // forward fragment to destination
            }
        }
    }
}
```

Figure 6:
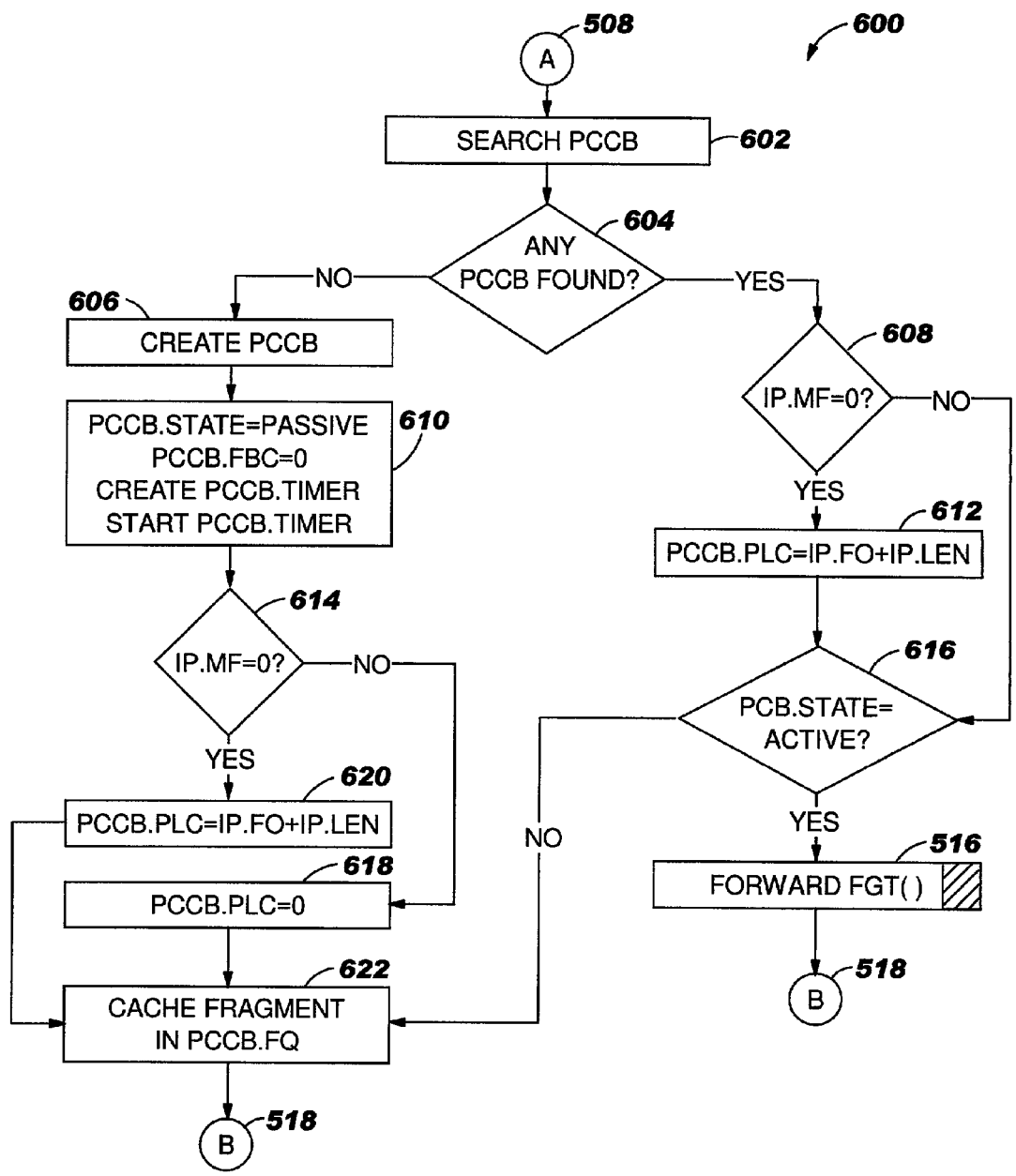
FIG. 6 is an exemplary flowchart representation of processing performed upon receipt of a sequentially non-first IP fragment of a fragmented datagram according to the present invention.

FIG. 6 is an exemplary flowchart representation 600 of processing performed upon receipt of a sequentially non-first IP fragment of a fragmented datagram according to the present invention. Initially, with reference to step 506 of FIG. 5, if the fragment offset of the received datagram is not zero (i.e., IP.FO!=0), then at step 508 of FIG. 5 processing continues to FIG. 6 at step 508. As aforementioned, all fragments of a fragmented IP datagram have the some of the same fields, such as, identification 210 (i.e., IP.FRID), protocol type 218 (i.e., IP.PT), source address 222 (i.e., IP.SA) and destination address 224 (i.e., IP.DA). Thus, at step 602 of FIG. 6 a search is conducted utilizing values of the foregoing fields of the received non-first IP fragment for a PCCB for the fragmented IP datagram that includes the received non-first IP fragment. If at step 604, the search reveals that a PCCB does has not been created for the fragmented IP datagram, at step 606 a PCCB is created for the fragmented IP datagram. The state of the PCCB is set to passive (i.e., PCCB.state=Passive) since a sequentially first fragment had not yet been received and hence there is no available content-based routing information. The fragment byte counter is set to zero (i.e., PCCB.FBC=0) since the fragment byte count is computed when the fragments are forwarded to their destination. A timer is then created and initiated (i.e., PCCB.timer) to identify how long the fragmented IP datagram is allowed to be on the Internet. At step 614, it is ascertained whether the more fragment flag of the received datagram is equal to zero (i.e., IP.MF=0), which represents that the received fragment is a sequentially last fragment of the fragment IP datagram. If the received datagram is the sequentially last fragment, a total size of the fragmented IP datagram is computed and stored in the place of the PCCB at step 620 by adding a length of the current fragment to its fragment offset (i.e., PCCB.PLC=IP.FO+IP.len). However, if the more fragment flag is not equal zero, which represents that the received fragment is an intermediate fragment and not the sequentially first or last fragment, the place of the PCCB is set to zero (i.e., PCCB.PLC=0) at step 618, and at step 622, the received fragment is added to the fragment queue of the PCCB (i.e., PCCB.FQ). It should be noted that all received fragments are queued in the fragment queue of the PCCB until a sequentially first fragment of the fragmented IP datagram is received, since it contains the necessary content-based routing information. At step 518, the method loops back to step 504 of FIG. 5 to receive another IP datagram.

However, if at step 604, the search reveals that a PCCB has not been created for the fragmented IP datagram, then at step 608 the more fragment flag of the received datagram is tested. That is, if the more fragment flag is equal to zero (i.e., IP.MF=0), it represents that the received fragment is a sequentially last fragment of the fragment IP datagram. Thus, since the received fragment is the sequentially last fragment, a total size of the fragmented IP datagram is computed and stored in the place of the PCCB at step 612 by adding a length of the current fragment to its fragment offset (i.e., PCCB.PLC=IP.FO+IP.len). However, if the more fragment flag at step 608 is not equal to zero, the flow proceeds to step 616, where it is determined whether the state of the PCCB is active (i.e., PCCB.state=Active), which means that a sequentially first fragment of the fragmented IP datagram has been previously received and content-based information required for routing has been stored in the PCCB. Thus, if the state of the PCCB is active, the last fragment is forwarded to its destination. However, if the state of the PCCB is not active (i.e., PCCB.state=Passive), the sequentially first fragment has not been received and the PCCB does not yet have the information necessary for content-based routing. Therefore, the received fragment is stored in fragment queue of the PCCB at step 622 and processing returns via step 518 to step 504 of FIG. 5.

Table 2 particularly illustrates a pseudo code representation of the inventive method depicted in the flowchart of FIG. 6, which illustrates processing performed upon receipt of a sequentially non-first IP fragment of a fragmented datagram in FIG. 5 according to the present invention.

TABLE 2

```
Else { // not the beginning of received datagram
    Search for PCCB (IP.SA, IP.DA, IP.PT, IP.FRID)
    If (PCCB not found) { // assume a first fragment received
        Create PCCB // create a packet cache control block
        PCCB.state=Passive// PCCB is passive since no destination
        parameters
        PCCB.FBC=0 // fragment byte counter set to zero
        Create and start PCCB.timer // timer needed
        If (IP.MF==0) { // it is the last fragment of the fragmented datagram
            PCCB.PLC=IP.FO+IP.len // total size of fragmented datagram
        }
        Else { // this is an intermediary fragment
            PCCB.PLC=0 // not the last fragment of the fragmented datagram
        }
```

TABLE 2-continued

```
    Put fragment into PCCB.FQ // store fragment in fragment queue of
    PCCB
  }
  Else {
    If (IP.MF==0) { // it is the last fragment of the fragmented datagram
      PCCB.PLC=IP.FO+IP.len // total size of fragmented datagarm
    }
    If (PCCB.state==Active) // sequentially first fragment has been
    received
      ForwardFGT() // forward the fragment to destination
    }
    Else { // state is not active
      Put fragment into PCCB.FQ // store fragment in fragment queue
    }
  }
}
```

Figure 4:
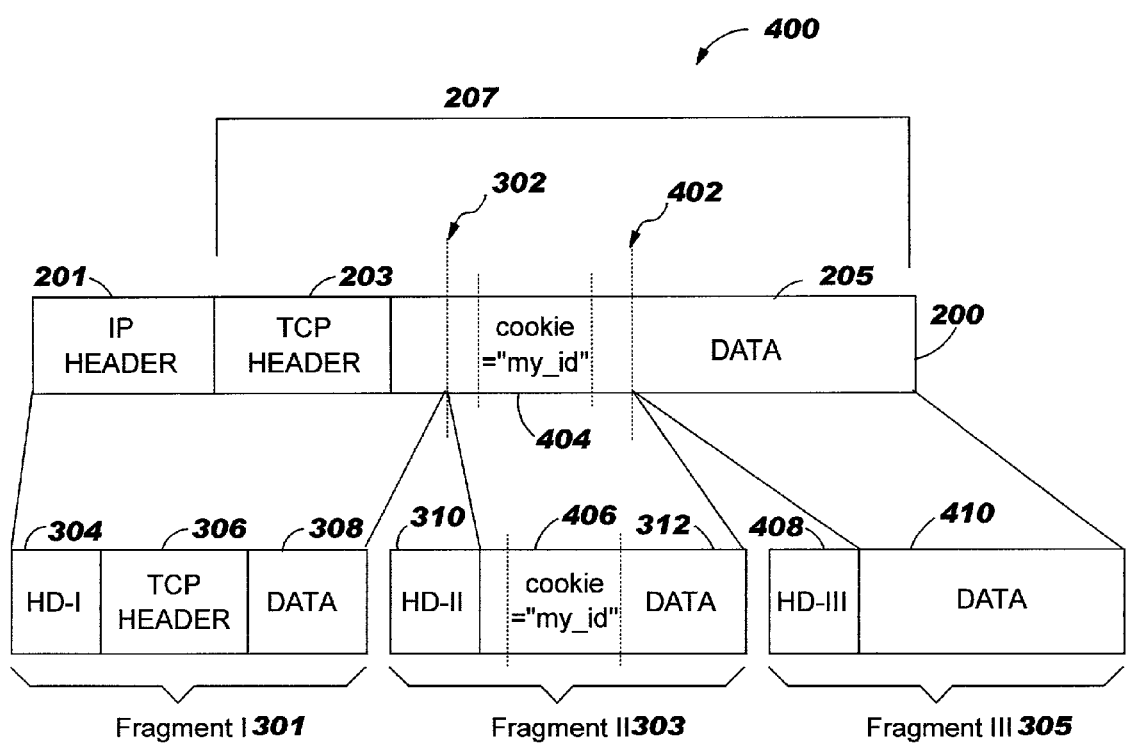
FIG. 4 depicts another variant of a prior art conventional fragmentation of the IP datagram of FIG. 2.
Figure 7:
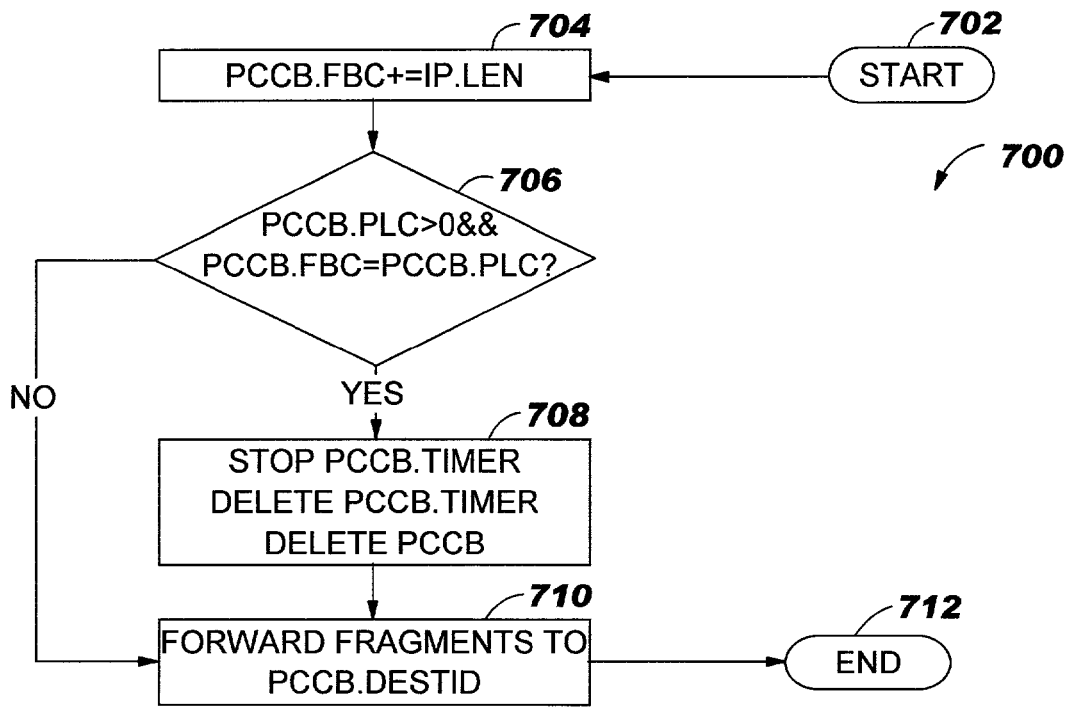
FIG. 7 is an exemplary flowchart representation of fragment forwarding procedure according to the present invention.

Although content-based routing information is primarily found in the sequentially first fragment of the fragmented IP datagram, the inventive method of FIGS. 5–8 may further be extended for those other cases where content-based information spans any one or more fragments. Such cases may include IP datagrams that are fragmented with their URLs, cookies, and the like spanning one or more fragments of the fragmented IP datagram, as particularly illustrated in FIG. 4. In such cases, block 506 of FIG. 5 may be replaced with a content-based information received flag (e.g., CBIR flag) that is initially set to false and then set to true upon receiving one or more fragments that completely identify necessary content-based information for the fragmented IP datagram. This flag is preferably a field added to the PCCB 900, which is particularly illustrated in FIG. 9. Additionally, a static or a dynamic pointer array may be provided in PCCB 900 of FIG. 9, which will store pointers to the one or more fragments stored in the fragments queue 908 which completely identify the content-based routing information (i.e., keeping track of the fragments which identify the content-based routing information). FIG. 7 is an exemplary flowchart representation 700 of fragment forwarding procedure ForwardFGT( ) according to the present invention. The procedure is invoked at step 702 from various points depicted in FIGS. 5 and 6 for forwarding a received IP fragment to a destination. At step 704, the fragment byte counter of the PCCB is updated, i.e., aggregated with the received IP fragment's length (i.e., PCCB.FBC+=IP.len). At step 706, it is determined whether all fragments in a fragmented IP datagram have been processed. This is ascertained by testing whether the place of PCCB that is calculated in FIGS. 5 and 6 is greater than zero and fragment byte counter of the PCCB is equal to the place of the PCCB (i.e., PCCB.PLC>0 && PCCB.FBC==PCCB.PLC). If all fragments of the fragmented IP datagram have been processed, at step 708 the timer of the PCCB is stopped and deleted. If however, all fragments have not been processed at step 706, then the received fragment is forwarded to its destination at step 710. The procedure exits at step 712 to the point from which it was invoked in FIGS. 5 and 6.

Table 3 particularly illustrates a pseudo code representation of the ForwardFGT( ) procedure depicted in the flowchart of FIG. 7.

TABLE 3

```
Procedure ForwardFGT() {
  PCCB.FBC+=IP.len //count bytes in fragment and aggregate into PCCB
  If(PCCB.PLC>0 && PCCB.FBC==PCCB.PLC) { // all fragments
  processed
```

TABLE 3-continued

```
    Stop and Delete PCCB.timer // free timer resources
    Delete PCCB // delete packet cache control block resources
  }
  Forward fragment to destination // all fragments have not been
  processed
}
```

Figure 8:
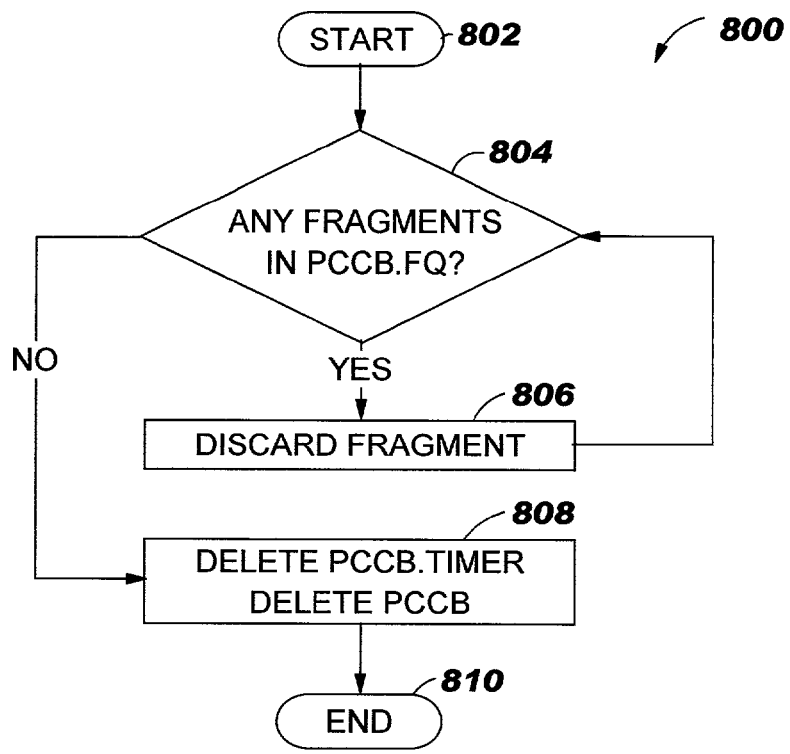
FIG. 8 is an exemplary flowchart representation of expired timer procedure according to the present invention.

FIG. 8 is an exemplary flowchart representation 800 of expired timer procedure TimerExpired( ) according to the present invention. This procedure represents a clean-up process for freeing utilized resources. It is assumed that a system, such as a router, a server load balancer or the like, in which the content-base routing device 1000 of FIG. 10 is incorporated, provides timer management functionality, such as timer control block 914, which can be invoked by the timer 906 of PCCB 900 of FIG. 9. Upon timer expiration, the timer management functionality invokes TimerExpired( ) procedure of FIG. 8. Thus, the procedure is invoked by timer management functionality, when the timer expires and it is necessary to destroy the fragments stored in the fragment queue because a sequentially first fragment has not been received before expiration of the timer. The procedure is entered at step 802. At steps 804 and 806, a looping sequence is performed in which all fragments that are stored in the fragment queue of the PCCB are discarded to free resources. At step 808, the timer of the PCCB is deleted and the PCCB is then deleted, which further frees resources. The procedure exists at step 810 and returns to step 504 of FIG. 5 to receive another IP datagram.

Table 4 particularly illustrates a pseudo code representation of the TimerExpired( ) procedure depicted in the flowchart FIG. 8.

TABLE 4

```
Procedure TimerExpired () {
  For all fragments in PCCB.FQ {
    Discard the fragments () // discard the fragment
  }
  Delete PCCB.timer // free timer resource
  Delete PCCB // delete packet cache control block resource
}
```

Figure 9:
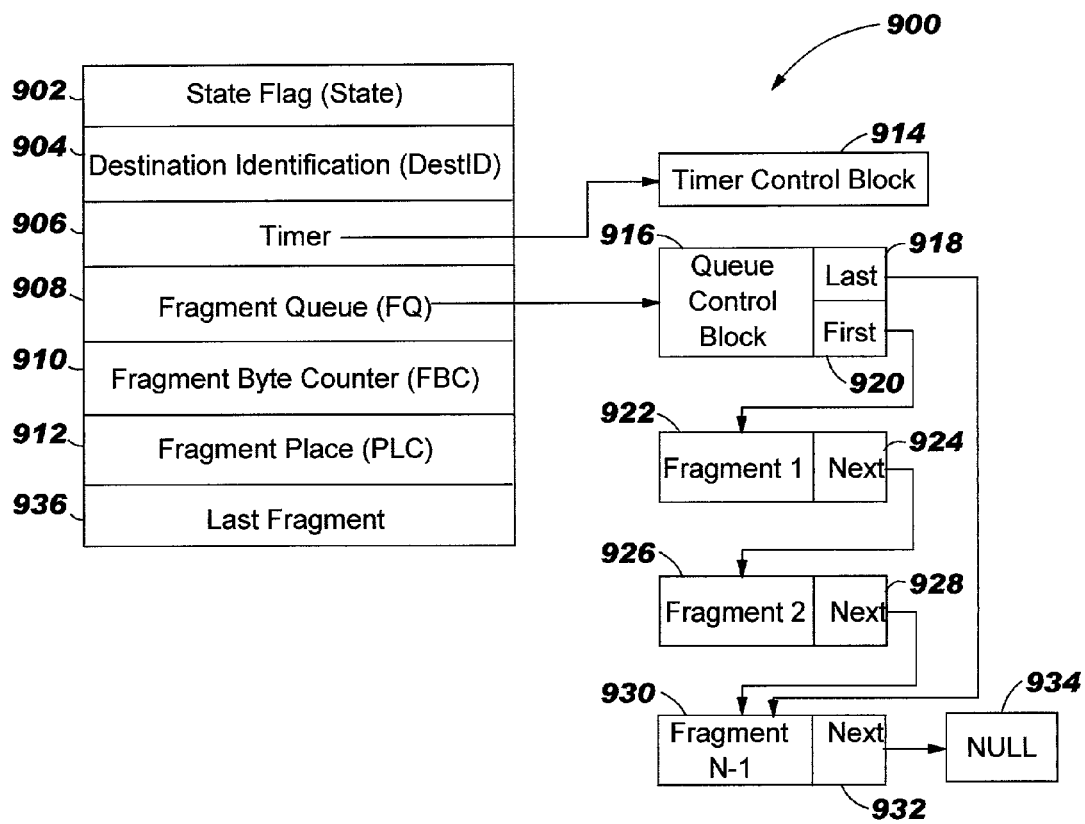
FIG. 9 is an exemplary block diagram of a Packet Cache Control Block according to the present invention.
Figure 10:
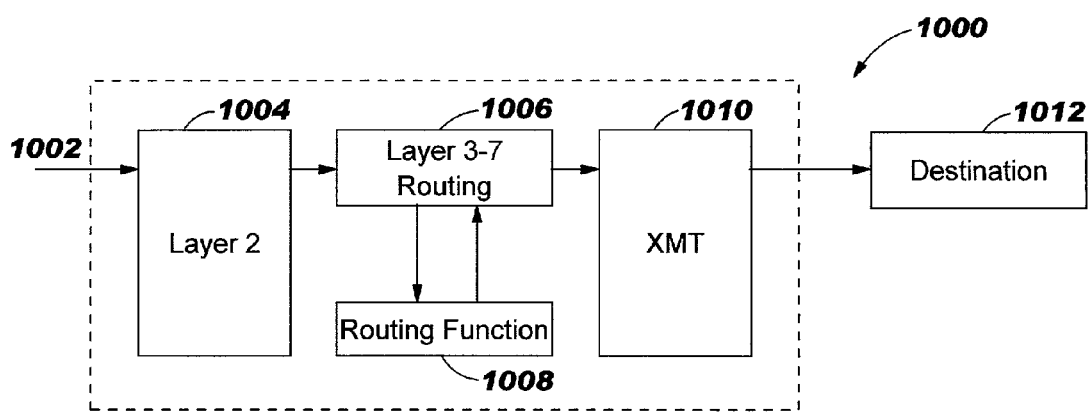
FIG. 10 is an exemplary representation of content-based routing device according to the present invention.

FIG. 9 represents an exemplary block diagram of a Packet Cache Control Block (i.e., "PCCB") 900 according to the present invention. As aforementioned, PCCB 900 may be a hardware or a software construct, or a combination thereof. The PCCB includes a state flag (i.e., state) 902, which is set to "active" when enough fragments of a fragmented IP dtagaram have been received to perform content-based routing, or which is set to "passive" when fragments including necessary content-based routing information have not all been received. The destination identification (i.e., "DestID") 904 represents a routing decision (described herein above with respect to FIGS. 11 and 12) to be made at a network node, which processes IP datagrams for performing content-based routing. As aforementioned, the DestID 904 uniquely identifies a destination to which all fragments of the fragmented IP datagram will be forwarded by a forwarding mechanism 914 of FIG. 10. The nature of the destination identifier 904 is dependent on system implementation of, for example, a router or a server load balancer. Additionally, based on the system implementation, the destination identifier 904 may be a byte, a word, a complex data structure, a string of characters, a proprietary identifier, or the like. The timer 906 is responsible for creating and staring a timer control block 914 upon receipt of a fragment for a fragmented IP datagram. The fragment queue (i.e., "FQ") 908 creates a queue control block 916 for managing fragments of a fragmented IP datagram, if such storage is required according to the present invention. The queue control block 916 includes first 920 and last 918 pointers, pointing respectively to a first fragment 922 and last fragment 930 in the FQ 908. Each of the fragments 922, 926, and 930 includes a next pointer 924, 928 and 932 for pointing to a subsequent fragment in the fragment queue 908. It should be noted that the last fragment in the fragment queue 908 points to NULL 934, which represents that there are no further fragments to be processed. FIG. 9 represents the fragment queue 908 as a standard singly-linked list. However, as one skilled in the art will appreciate, the fragment queue 908 may be implemented as a doubly-linked list, a simple static or dynamic array, and the like. It is preferable that the received fragments that need to be stored in the fragment queue 908 are stored in their natural order, i.e., the order in which they are received. This means that any subsequent fragment received is appended to the end of the fragment queue 908, and last pointer 918 of fragment control block 916 points to such subsequent fragment. Alternatively, a skilled artisan will readily appreciate that, it is possible to extend the processing performed by the fragment queue 908 by reordering the fragments in the fragment queue 908 according to their sequential order in the fragmented IP datagram. Although the reordering of fragments within the fragment queue 908 may utilize more resources (i.e., computational resources) than performing no reordering, reordering may positively affect overall network performance.

Additionally with regard to FIG. 9, processing of received fragments may further easily be improved by adding a mechanism for ensuring that the last fragment is always forwarded last, i.e., in sequential order to the other fragments of the fragment IP datagram. According to the present invention depicted in FIGS. 5–8, the sequentially first fragment is always forwarded first. Forwarding the sequentially last fragment last may be accomplished by providing a separate queue 936 within the PCCB for the last fragment, or providing a pointer within the PCCB to identify the sequentially last fragment in the fragment queue (i.e., FQ) of the PCCB, so that the last fragment is not forwarded until all other fragments have been received and processed, thereby enabling a full processing of the fragmented IP datagram. This routing order (i.e., sequentially first fragment routed first and sequentially last fragment routed last) is most important because these IP fragments trigger routing or reassembly mechanisms at different nodes on a network, such as routers and server load balancers. Therefore, it is preferable for overall network performance, that the sequentially fist fragment is routed first and the sequentially last fragment is routed last to a destination.

The foregoing inventive system and method of the present invention represent a distinct advantage over the conventional reassembly process. That is, in conventional reassembly, it is necessary to maintain a reassembly queue to a depth of N−1 for storing fragments of any fragmented IP datagram, wherein N represents a number of fragments into which the fragmented IP datagram is divided (i.e., fragmented). That is, the conventional reassembly queue is entirely filled up to N−1 fragments for each fragmented IP datagram, regardless of the order of the fragments, before reassembly is performed. According to the present invention, the fragment queue (i.e., FQ) 908 of the PCCB 900 of FIG. 9 is only utilized when necessary. That is, when all fragments are sequentially ordered when received, the fragment queue remains empty, i.e., no storage of fragments is performed, thereby minimizing use of resources and improving efficiency. When on the other hand, a sequentially first fragment is received last, i.e., after all other fragments, the fragment queue filled up to a depth of N−1 fragments. However, even in this case no reassembly is performed, thereby still minimizing resources (i.e., computing resources necessary for reassembly) necessary for content-based routing.

FIG. 10 is an exemplary routing device 1000 for content-based routing of fragments of a datagram according to the present invention. As aforementioned, the routing device 1000 embodying the present invention may be located at a router at the core or at the edge of a network, a server load balancer, a server, a firewall, and the like. A frame 1002 that includes an IP datagram is received at layer 2 of the OSI model 1004. Layer 2 1004 extracts the IP datagram and forwards it to the layer 3 through layer 7 routing mechanism 1006, which utilizes a routing function 1008 according to the inventive method described above with regard to FIG. 5–8 to provide content-based routing. In the inventive system as described hereinabove with reference to FIG. 5–8, fragments are not reassembled by the routing function 1008, but instead a Packet Cache Control Block is generated and only enough fragments are stored in its fragment queue until content-based routing information is available, from the received one or more fragments of the fragmented IP datagram. Upon receiving a sufficient number of fragments to identify content-based routing information and determining the destination identification 904 of FIG. 9, the layer 3–layer 7 routing mechanism 1006 forwards all stored fragments to the XMT forwarding mechanism 1010, which in turn utilizing the destination identification of the PCCB for the fragment IP datagram forwards the fragments to their destination 1012.

Figure 11:
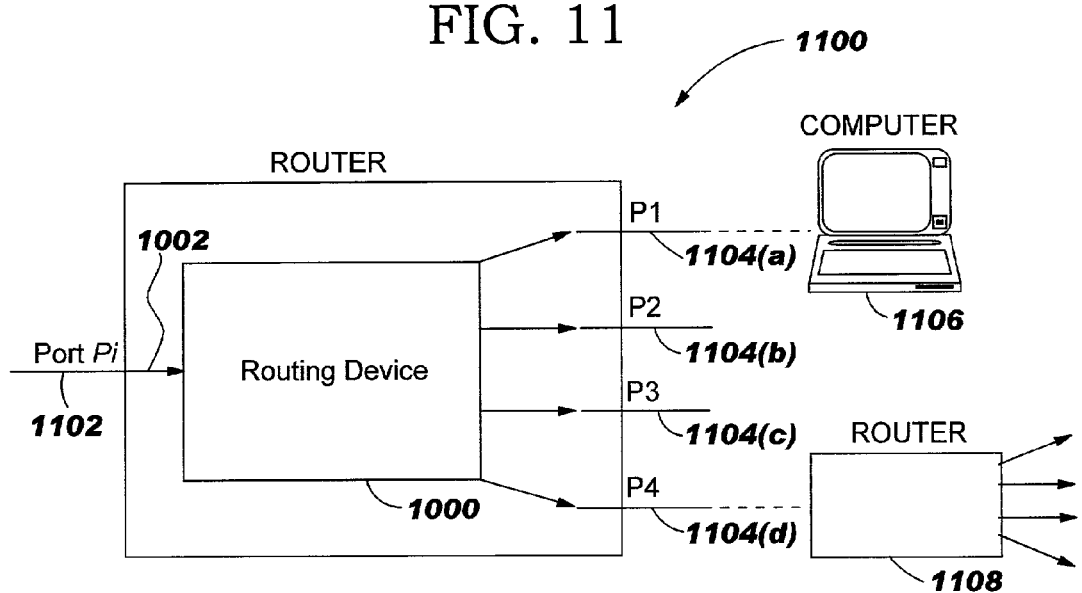
FIG. 11 is an exemplary representation of a router including the content-based routing device of FIG. 10 according to the present invention.

FIG. 11 is an exemplary representation of a router 1100 including the content-based routing device of FIG. 10 according to the present invention. The router 1100 has a port $P_i$ 1102 that physically receives frames 1002, which include IP datagrams, from a network (e.g., Internet) and forwards them to the content-based routing device 1000. The routing device 1000 performs content-based routing according to the present invention, as described with reference to FIGS. 5–8 and 10. The XMT forwarding mechanism 1010 of the routing device 1000 forwards received fragments for a particular fragmented IP datagram to the their destination 1012, as identified by destination identifier (i.e., "DestID") 904 of the PCCB 900 of FIG. 9. Consequently, the destination identifier may represent different ports of the router 1100, such as port $P_1$ 1104(a) through port $P_4$ 11104(d). For example, port $P_1$ 1104(a) of the router 1100 may route the fragments to computer 1106 on this port, while port $P_3$ 1104(c) may route the fragments to a router 1008 for further routing. Respective ports $P_2$ 1104(b) and $P_4$ 1104(d) may further be implemented in accordance with particular system requirement for the router 1100.

Figure 12:
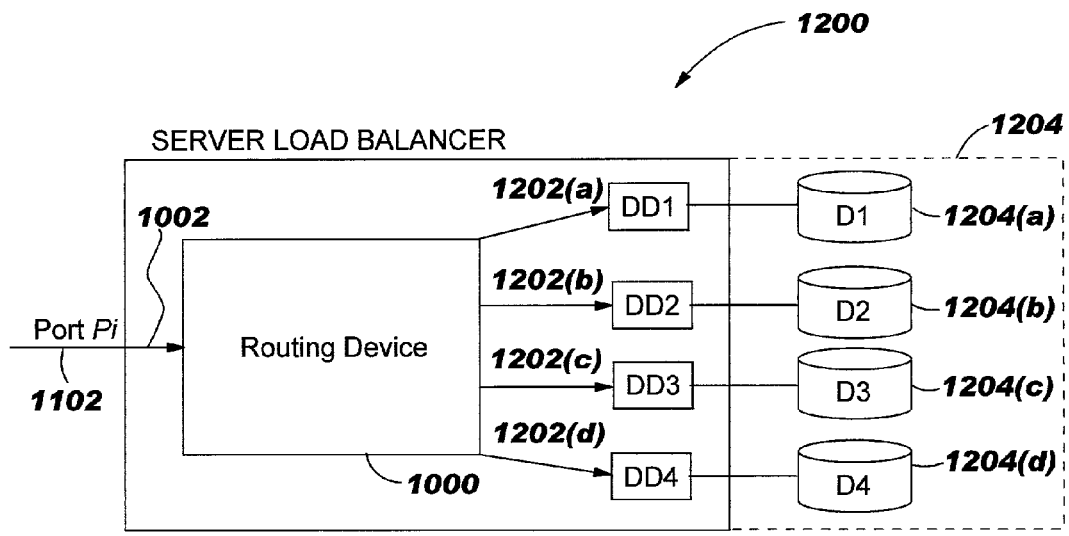
FIG. 12 is an exemplary representation of a server load balancer including the content-based routing device of FIG. 10 according to the present invention.

FIG. 12 is an exemplary representation of a server load balancer 1200 including the content-based routing device of FIG. 10 according to the present invention. As in the case of the router of FIG. 11, the server load balance 1200 has port $P_i$ 1102 that physically receives frames 1002, which include IP datagrams, from a network (e.g., Internet) and forwards them to the content-based routing device 1000. The routing device 1000 performs content-based routing as described with respect to FIG. 10. The XMT forwarding mechanism 1010 of the routing device 1000 of FIG. 10 forwards received fragments for a particular fragmented IP datagram to the their destination 1012, as identified by destination identifier (i.e., "DestID") 904 of the PCCB 900 of FIG. 9. In the case of the server load balancer 1200, the fragments for the fragmented IP datagram are forwarded, as identified by the destination identifier 904, to storage device drivers $DD_1$ 1202(*a*), $DD_2$ 1202(*b*), $DD_3$ 1202(*c*) or $DD_4$ 1202(*d*), which forward the fragments to their respective destinations 1204, i.e., storage devices $D_1$ 1204(*a*), $D_2$ 1204(*b*), $D_3$ 1204(*c*) or $D_4$ 1202(*d*).

While the invention has been particularly shown and described to a preferred embodiment thereof, it will be understood by those skilled in the art that the foregoing and other changes in forma and details may be made therein without departing from the spirit and scope of the invention.

Having thus described our invention, what we claim as new, and desire to secure by Letters Patent is:

1. A method for routing a datagram that has been fragmented into a plurality of fragments utilizing content-based routing information included in one or more fragments of the plurality of fragments, the method comprising:
   (a) generating a context for the datagram associated with routing the plurality of fragments of the datagram and setting the context for the datagram to passive until content-based routing information included in the one or more fragments is received;
   (b) caching received fragments while the context is set passive;
   (c) determining a destination for routing the plurality of fragments when content-based routing information included in the one or more fragments is received and setting the context for the datagram to active; and
   (d) routing any cached fragments and subsequently received fragments of the datagram to the determined destination while the context is active without reassembling the plurality of fragments into the datagram.

2. The method according to claim 1, wherein the routing step routes the subsequently received fragments without caching the subsequently received fragments.

3. The method according to claim 1, wherein the content-based routing information is included in a sequentially first fragment of the datagram.

4. The method according to claim 3, wherein the routing step further comprises routing the sequentially first fragment to the determined destination before the any cached fragments.

5. The method according to claim 1, wherein the routing step further comprises routing a sequentially last fragment of the plurality of fragments of the datagram to the determined destination after all other of the plurality of fragments have been routed to the determined destination.

6. The method according to claim 5, the method further comprising a step of tracking an aggregate length of the plurality of fragments by incrementing a fragment byte counter by a data length of each fragment of the datagram.

7. The method according to claim 6, the method further comprising a step of identifying whether the plurality of fragments of the datagram have been processed, the identifying step comprising:
   calculating a total length of the sequentially last fragment by adding its fragment offset and its data length; and
   comparing the aggregate length against the total length of the sequentially last fragment.

8. The method according to claim 1, the method further comprising a step of starting a timer upon generating the context for identifying a time period that the datagram is allowed to be on a network.

9. The method according to claim 8, the method further comprising a step of discarding any cached fragments upon expiration of the timer.

10. The method according to claim 1, the method further comprising a step of discarding any cached fragments if the content-based routing information is not received.

11. The method according to claim 1, the method further comprising a step of providing a fragment queue associated with the context for the datagram for caching the fragments.

12. The method according to claim 1, wherein the content-based routing information consists of one or more of the following:
   one or more fields of an Internet Protocol (IP) header of the datagram;
   one or more fields of the Transmission Control Protocol (TCP) header of the datagram;
   one or more Universal Resource Locators (URLs) of the datagram; and
   one or more cookies of the datagram.

13. A system for routing a datagram that has been fragmented into a plurality of fragments utilizing content-based routing information included in one or more fragments of the plurality of fragments, the system comprising:
   (a) a receiving mechanism for receiving the plurality of fragments of the datagram;
   (b) a control mechanism for generating a context for the datagram associated with routing the plurality of fragments of the datagram and setting the context for the datagram to passive until content-based routing information included in the one or more fragments is received;
   (c) a cache for caching received fragments while the context is set to passive;
   (d) a routing mechanism for determining a destination for routing the plurality of fragments when content-based routing information included in the one or more fragments is received and setting the context for the datagram to active; and
   (e) a forwarding mechanism for transmitting any cached fragments and subsequently received fragments of the datagram to the determined destination while the context is active without reassembly of the plurality of fragments into the datagram.

14. The system according to claim 13, wherein the subsequently received fragments are transmitted to the determined destination without being cached.

15. The system according to claim 13, wherein the content-based routing information is included in a sequentially first fragment of the datagram.

16. The system according to claim 15, wherein the sequentially first fragment is transmitted to the determined destination before the any cached fragments.

17. The system according to claim 13, wherein a sequentially last fragment of the plurality of fragments of the datagram is transmitted to the determined destination after all other of the plurality of fragments have been transmitted to the determined destination.

18. The system according to claim 17, an aggregate length of the plurality of fragments is tracked by incrementing a fragment byte counter by a data length of each fragment of the datagram.

19. The system according to claim 18, wherein the system further comprises an a mechanism for identifying whether the plurality of fragments of the datagram have been processed, the identifying mechanism comprising:
   calculating a total length of the sequentially last fragment by adding its fragment offset and its data length; and comparing the aggregate length against the total length of the sequentially last fragment.

20. The system according to claim 13, wherein a timer is started upon generating the context for identifying a time period that the datagram is allowed to be on a network 1.

21. The system according to claim 20, wherein any cached fragments are discarded upon expiration of the timer.

22. The system according to claim 13, wherein any cached fragments are discarded if the content-based routing information is not received.

23. The system according to claim 13, wherein a fragment queue associated with the context for the datagram is provided for caching the fragments.

24. The system according to claim 1, wherein the content-based routing information consists of one or more of the following:
   one or more fields of an Internet Protocol (IP) header of the datagram;
   one or more fields of the Transmission Control Protocol (TCP) header of the datagram;
   one or more Universal Resource Locators (URLs) of the datagram; and
   one or more cookies of the datagram.

25. A program storage device readable by a machine, tangibly embodying a program of instructions executable by the machine to perform the method steps for routing a datagram that has been fragmented into a plurality of fragments utilizing content-based routing information included in one or more fragments of the plurality of fragments, the method comprising:
   (a) generating a context for the datagram associated with routing the plurality of fragments of the datagram and setting the context for the datagram to passive until content-based routing information included in the one or more fragments is received;
   (b) caching received fragments while the context is set to passive;
   (c) determining a destination for routing the plurality of fragments when content-based routing information included in the one or more fragments is received and setting the context for the datagram to active; and
   (d) routing any cached fragments and subsequently received fragments of the datagram to the determined destination while the context is active without reassembling the plurality of fragments into the datagram.

26. The program storage device according to claim 25, wherein the routing step routes the subsequently received fragments without caching the subsequently received fragments.

27. The program storage device according to claim 25, wherein the content-based routing information is included in a sequentially first fragment of the datagram.

28. The program storage device according to claim 27, wherein the routing step further comprises routing the sequentially first fragment to the determined destination before the any cached fragments.

29. The program storage device according to claim 25, wherein the routing step further comprises routing a sequentially last fragment of the plurality of fragments of the datagram to the determined destination after all other of the plurality of fragments have been routed to the determined destination.

30. The program storage device according to claim 29, the method further comprising a step of tracking an aggregate length of the plurality of fragments by incrementing a fragment byte counter by a data length of each fragment of the datagram.

31. The program storage device according to claim 30, the method further comprising a step of identifying whether the plurality of fragments of the datagram have been processed, the identifying step comprising:
   calculating a total length of the sequentially last fragment by adding its fragment offset and its data length; and
   comparing the aggregate length against the total length of the sequentially last fragment.

32. The program storage device according to claim 25, the method further comprising a step of starting a timer upon generating the context for identifying a time period that the datagram is allowed to be on a network.

33. The program storage device according to claim 32, the method further comprising a step of discarding any cached fragments upon expiration of the timer.

34. The program storage device according to claim 25, the method further comprising a step of discarding any cached fragments if the content-based routing information is not received.

35. The program storage device according to claim 25, the method further comprising a step of providing a fragment queue associated with the context for the datagram for caching the fragments.

36. The program storage device according to claim 25, wherein the content-based routing information consists of one or more of the following:
   one or more fields of an Internet Protocol (IP) header of the datagram;
   one or more fields of the Transmission Control Protocol (TCP) header of the datagram;
   one or more Universal Resource Locators (URLs) of the datagram; and
   one or more cookies of the datagram.

37. A router for routing a datagram that has been fragmented into a plurality of fragments utilizing content-based routing information included in one or more fragments of the plurality of fragments, the router comprising:
   (a) a receiving mechanism for receiving the plurality of fragments of the datagram;
   (b) a control mechanism for generating a context for the datagram associated with routing the plurality of fragments of the datagram and setting the context for the datagram to passive until content-based routing information included in the one or more fragments is received;
   (c) a cache for caching received fragments while the context is set to passive;
   (d) a routing mechanism for determining a destination port for routing the plurality of fragments when content-based routing information included in the one or more fragments is received and setting the context for the datagram to active; and
   (e) a forwarding mechanism for transmitting any cached fragments and subsequently received fragments of the datagram to the determined destination port while the context is active without reassembly of the plurality of fragments into the datagram.

38. A server load balancer for routing a datagram that has been fragmented into a plurality of fragments utilizing content-based routing information included in one or more fragments of the plurality of fragments, the router comprising:
   (a) a receiving mechanism for receiving the plurality of fragments of the datagram;
   (b) a control mechanism for generating a context for the datagram associated with routing the plurality of fragments of the datagram and setting the context for the datagram to passive until content-based routing information included in the one or more fragments is received;
(c) a cache for caching received fragments while the context is set to passive;
(d) a routing mechanism for determining a destination device driver for routing the plurality of fragments when content-based routing information included in the one or more fragments is received and setting the context for the datagram to active; and
(e) a forwarding mechanism for transmitting any cached fragments and subsequently received fragments of the datagram to the determined destination device driver while the context is active without reassembly of the plurality of fragments into the datagram.

39. A method for routing a datagram that has been fragmented into a plurality of fragments utilizing content-based routing information included in one or more fragments of the plurality of fragments, the method comprising:
(a) generating a context for the datagram associated with routing the plurality of fragments of the datagram;
(b) determining a destination for routing the plurality of fragments when content-based routing information included in the one or more fragments is received and setting the context for the datagram to active; and
(d) routing subsequently received fragments of the datagram to the determined destination while the context is active without reassembling the plurality of fragments into the datagram.

* * * * *